(12) United States Patent
Guo et al.

(10) Patent No.: US 9,047,919 B1
(45) Date of Patent: Jun. 2, 2015

(54) DISK DRIVE INITIALIZING SERVO READ CHANNEL BY READING DATA PRECEDING SERVO PREAMBLE DURING ACCESS OPERATION

(71) Applicant: Western Digital Technologies, Inc., Irvine, CA (US)

(72) Inventors: Guoxiao Guo, Irvine, CA (US); Richard K. Wong, San Jose, CA (US); Davide Giovenzana, Longmont, CO (US); John W. Vanlaanen, Louisville, CO (US); Teik EE Yeo, Trabuco Canyon, CA (US); Jie Yu, Irvine, CA (US)

(73) Assignee: Western Digitial Technologies, Inc., Irvine, CA (US)

( * ) Notice: Subject to any disclaimer, the term of this patent is extended or adjusted under 35 U.S.C. 154(b) by 0 days.

(21) Appl. No.: 13/797,953

(22) Filed: Mar. 12, 2013

(51) Int. Cl.
- *G11B 5/09* (2006.01)
- *G11B 20/10* (2006.01)
- *G11B 5/596* (2006.01)

(52) U.S. Cl.
CPC ...... *G11B 20/10222* (2013.01); *G11B 5/59616* (2013.01)

(58) Field of Classification Search
None
See application file for complete search history.

(56) References Cited

U.S. PATENT DOCUMENTS

| | | | |
|---|---|---|---|
| 5,784,216 A | 7/1998 | Zaharris | |
| 5,784,219 A | 7/1998 | Genheimer | |
| 5,963,387 A * | 10/1999 | Son | 360/49 |
| 6,009,549 A | 12/1999 | Bliss et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |

(Continued)

OTHER PUBLICATIONS

Guoxiao Guo, et al., U.S. Appl. No. 13/418,966, filed Mar. 13, 2012, 21 pages.

(Continued)

*Primary Examiner* — Dismery Mercedes

(57) ABSTRACT

A disk drive is disclosed comprising a disk having a plurality of data tracks defined by servo sectors, where each data track comprises a plurality of data sectors, and each servo sector comprises a servo preamble and servo data. The disk drive further comprises a head comprising a read element and a write element, and a servo read channel comprising an analog front end and a timing recovery circuit. During an access operation, data preceding the servo preamble of a first servo sector in the first data track is read in order to initialize the analog front end of the servo read channel. At least part of the servo preamble is read to initialize the timing recovery circuit of the servo read channel, and at least part of the servo data of the servo sector is read using the timing recovery circuit.

14 Claims, 3 Drawing Sheets

(56) References Cited

U.S. PATENT DOCUMENTS

| | | |
|---|---|---|
| 6,243,223 B1 | 6/2001 | Elliott et al. |
| 6,265,868 B1 | 7/2001 | Richter |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,469,853 B1 * | 10/2002 | Satoh .................. 360/48 |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,680,609 B1 | 1/2004 | Fang et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,865,042 B2 | 3/2005 | Dunn et al. |
| 6,867,944 B1 | 3/2005 | Ryan |
| 6,876,508 B1 | 4/2005 | Patton, III et al. |
| 6,882,486 B1 | 4/2005 | Kupferman |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,259 B2 | 9/2005 | Osafune |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,057,836 B1 | 6/2006 | Kupferman |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,577 B1 | 8/2006 | Codilian et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,119,537 B2 | 10/2006 | Che et al. |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | |
|---|---|---|
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,529,050 B2 | 5/2009 | Shen et al. |
| 7,529,320 B2 * | 5/2009 | Byrne et al. ............... 375/326 |
| 7,542,225 B1 | 6/2009 | Ding et al. |
| 7,548,392 B1 | 6/2009 | Desai et al. |
| 7,551,379 B2 | 6/2009 | Yu et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,586,704 B2 * | 9/2009 | Annampedu ............... 360/39 |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,724,464 B2 * | 5/2010 | Kisaka et al. ............. 360/77.01 |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,907,361 B2 | 3/2011 | Deng et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,974,035 B2 * | 7/2011 | Bliss et al. ................ 360/51 |
| 7,982,989 B1 | 7/2011 | Shi et al. |
| 7,982,990 B1 * | 7/2011 | Yu et al. ................... 360/39 |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,395,858 B1 * | 3/2013 | Han et al. ................. 360/51 |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,878 B1 * | 8/2013 | Zou et al. ................. 360/51 |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,711,506 B1 | 4/2014 | Giovenzana et al. |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |

(56) References Cited

U.S. PATENT DOCUMENTS

| | | |
|---|---|---|
| 8,749,904 B1 | 6/2014 | Liang et al. |
| 2004/0243455 A1* | 12/2004 | Smith ............................... 705/7 |
| 2005/0243455 A1* | 11/2005 | Annampedu ................... 360/46 |
| 2010/0035085 A1 | 2/2010 | Jung et al. |
| 2010/0123962 A1* | 5/2010 | O'Brien et al. ................. 360/31 |
| 2011/0188365 A1* | 8/2011 | Maeto ........................ 369/59.22 |
| 2012/0281305 A1* | 11/2012 | Xia et al. ......................... 360/32 |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0250447 A1* | 9/2013 | Erden ............................. 360/51 |

OTHER PUBLICATIONS

Guoxiao Guo, et al., U.S. Appl. No. 13/614,894, filed Sep. 13, 2012, 26 pages.

* cited by examiner

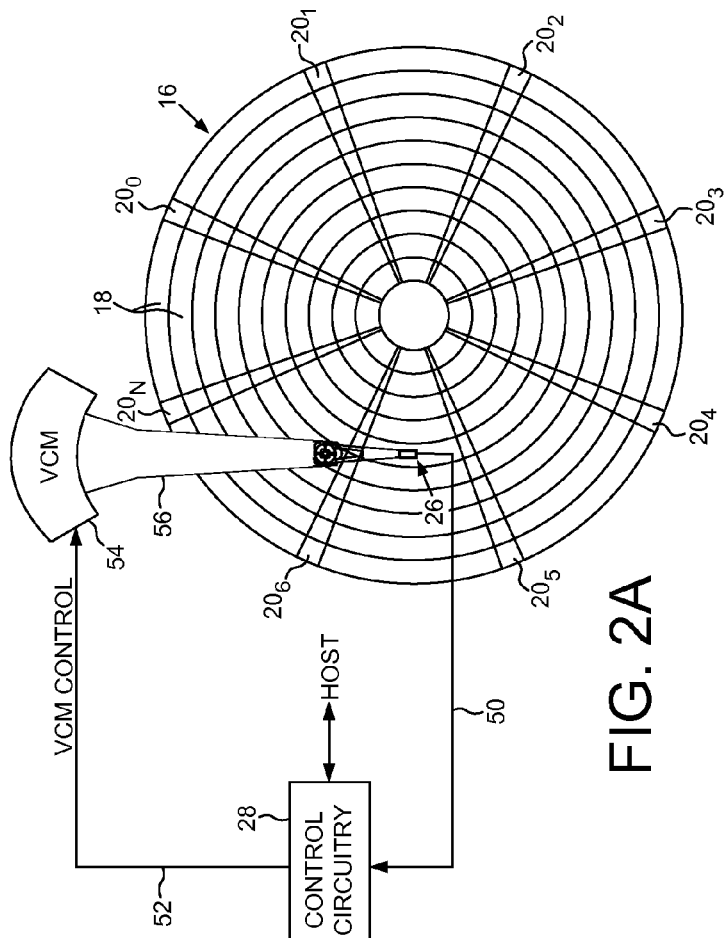
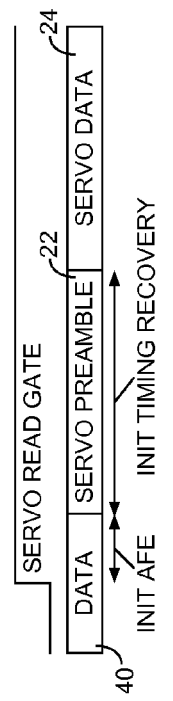
FIG. 2A
FIG. 2B
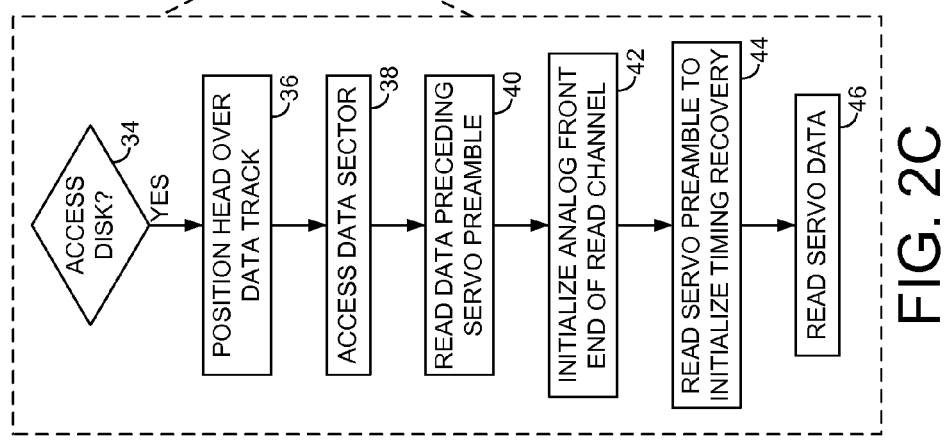
FIG. 2C

DISK DRIVE INITIALIZING SERVO READ CHANNEL BY READING DATA PRECEDING SERVO PREAMBLE DURING ACCESS OPERATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track and wedge address) which is read by the head and processed by a servo control system to control the actuator arm as it seeks from track to track as well as establish rotational position of the head.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address (Gray coded) and wedge address, used to position the head over a target data track during a seek operation and monitor the rotational position with respect to a reference index-wedge. Each servo sector 4, further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

BRIEF DESCRIPTION OF THE DRAWINGS

FIG. 2A shows a disk drive according to an embodiment comprising a head actuated over a disk.

FIG. 2B illustrates an embodiment wherein a servo gate is opened early over data preceding a servo preamble.

FIG. 2C is a flow diagram according to an embodiment wherein during an access operation, data preceding the servo preamble is read in order to initialize an analog front end of a servo read channel.

DETAILED DESCRIPTION

Figure 1:
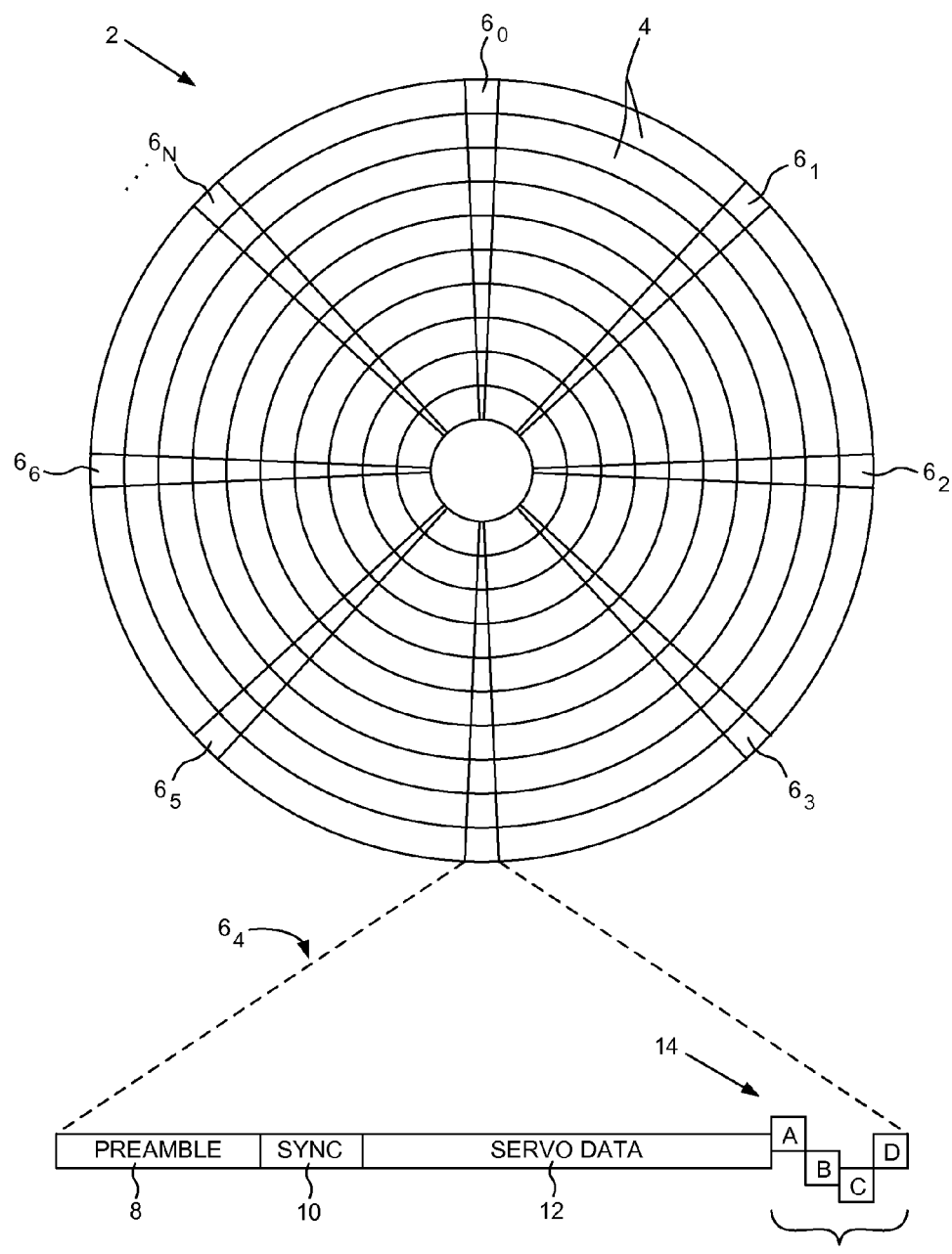
FIG. 1 shows a prior art disk format comprising a plurality of servo tracks defined by embedded servo sectors.

FIG. 2A shows a disk drive according to an embodiment comprising a disk 16 having a plurality of data tracks 18 defined by servo sectors $20_0$-$20_N$, where each data track comprises a plurality of data sectors, and each servo sector comprises a servo preamble 22 and servo data 24 (FIG. 2B). The disk drive further comprises a head 26 comprising a read element and a write element, and control circuitry 28 comprising a servo read channel (FIG. 3) including an analog front end (AFE) 30 and a timing recovery circuit 32. The control circuitry 28 is operable to execute the flow diagram of FIG. 2C, wherein during an access operation (block 34) the head is positioned over a first data track (block 36), and during a revolution of the disk, a first data sector of the first data track is accessed (block 38). After accessing the first data sector, data 40 (FIG. 2B) preceding the servo preamble 22 of a first servo sector in the first data track is read (block 40) in order to initialize the AFE 30 of the servo read channel (block 42). At least part of the servo preamble 22 is read to initialize the timing recovery circuit 32 of the servo read channel (block 44), and at least part of the servo data 24 of the servo sector is read using the timing recovery circuit (block 46).

In the embodiment of FIG. 2A, the control circuitry 28 processes a read signal 50 emanating from the head 26 to demodulate the servo sectors $20_0$-$20_N$ and generate a position error signal (PES) representing an error between the actual position of the head and a target position relative to a target track. The control circuitry 28 filters the PES using a suitable compensation filter to generate a control signal 52 applied to a voice coil motor (VCM) 54 which rotates an actuator arm 56 about a pivot in order to actuate the head 26 radially over the disk 18 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern (FIG. 1) or a phase based servo pattern.

Figure 3:
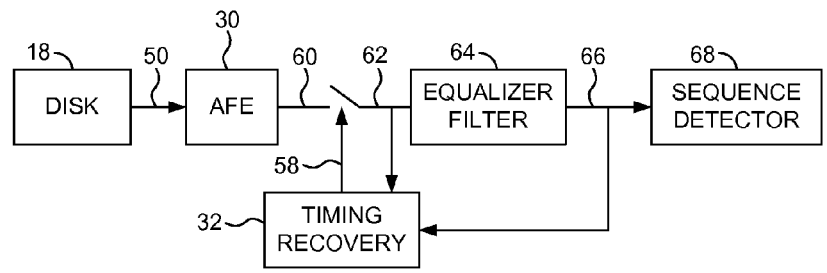
FIG. 3 shows a servo read channel according to an embodiment comprising an analog front end and a timing recovery circuit.

During an access operation (write/read), the control circuitry 28 seeks the head 26 to a target data track, and then tracks a centerline of the data track in response to the servo sectors $20_0$-$20_N$. In order to demodulate a servo sector $20_i$, the control circuitry 28 opens a servo gate, and in an embodiment illustrated in FIG. 2B, the servo gate is opened when the head 26 is over data 40 that precedes the servo preamble 22 in order to initialize the AFE 30 of the servo read channel (FIG. 3). When the head 26 reaches the servo preamble 22, the AFE 30 has been properly initialized so that the timing recovery circuit 32 may be synchronized in response to the servo preamble 22. This allows the length of the servo preamble 22 to be reduced as compared to a prior art technique of using the beginning of the servo preamble 22 to initialize the AFE 30. Reducing the length of the servo preamble 22 can improve the format efficiency and can increase the overall capacity of the disk 18.

In the embodiment of FIG. 3, the AFE 30 comprises suitable circuitry for preconditioning the read signal 50, such as an analog filter (e.g., a low pass filter) for shaping the read signal 50 toward a desired response (e.g., a partial response). The timing recovery circuit 32 generates a sampling clock 58 for use in sampling the analog signal 60 output by the AFE 30 to generate signal samples 62. The signal samples 62 may be equalized by an equalizer filter 64 in order to further shape the signal samples 62 toward the desired response, and the equalized signal samples 66 may be processed by a sequence detector 68 to detect the servo data 24.

In one embodiment, the timing recovery circuit 32 generates the sampling clock 58 synchronous to the data rate of the servo data (i.e., the analog signal 60 is sampled synchronously). Accordingly in this embodiment the servo preamble 22 is processed in order to initially synchronize the timing recovery circuit 32 prior to reading the servo data 24. In one embodiment, the timing recovery circuit 32 executes a zero-phase start operation wherein the phase of a phase-locked loop (PLL) is initialized based on the first few signal samples of the servo preamble 22. Once the phase of the PLL has been initialized, the remaining signal samples of the servo preamble 22 are processed to further lock the PLL to the frequency/phase of the servo preamble 22. Accordingly, in one embodiment the control circuitry 28 enables the servo read gate (FIG. 2B) to begin initializing the AFE 30, and then enables another internal gate to enable the timing recovery circuit 32 to execute the zero-phase start operation. Other embodiments may employ interpolated timing recovery (ITR), wherein the analog signal 60 output by the AFE 30 may be sampled asynchronously, and the asynchronous signal samples interpolated to generate the synchronous signal samples. An embodiment employing an ITR type timing recovery may also execute a zero-phase start operation at the beginning of the servo preamble 22.

At least some of the components of the servo read channel shown in FIG. 3 may also be used to read the data sectors of a data track. In one embodiment, some of the components of the read channel may be configured based on whether the read channel is reading a data sector or a servo sector (e.g., the AFE 30 and equalizer filter 64 may be configured to adjust the filtering of the read signal). In one embodiment, the sequence detector 68 may be used to detect both the user data of a data sector and the servo data of a servo sector. In another embodiment, the sequence detector for detecting the servo data may be less complex than the sequence detector for detecting the user data in order to reduce the latency of the detection algorithm, thereby improving performance of the servo algorithm.

Figure 4:
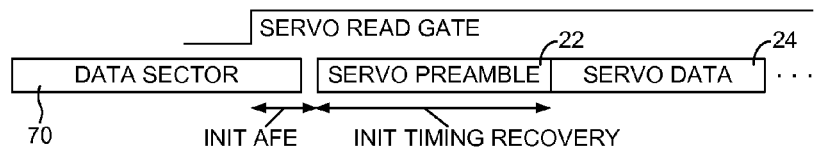
FIG. 4 shows an embodiment wherein the data preceding the servo preamble comprises data of a data sector in a data track.

Any suitable data 40 may precede the servo preamble 22 in FIG. 2B, wherein in an embodiment shown in FIG. 4 the data comprises data of a data sector 70 preceding the servo preamble 22. The data of the data sector 70 may comprise random (i.e., unknown) user data that is written to the disk during a write operation. Even though the frequency content of the random user data may be different than the servo preamble 22, the random user data may still be used to initialize the AFE 30 which is why the servo gate is opened while the head is still over the data sector 70. In one embodiment, the gap between the end of the data sector 70 and the beginning of the servo preamble 22 is erased (e.g., AC erased) so that the DC component of the read signal is substantially zero, thereby matching the DC component of the servo preamble 22.

Figure 5:
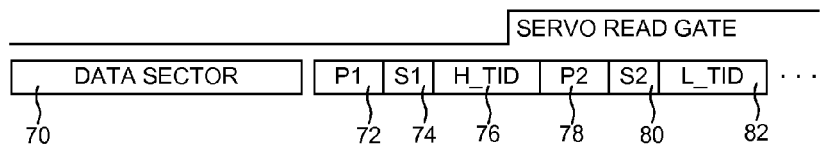
FIG. 5 shows an embodiment wherein the data preceding the servo preamble comprises servo data in the servo sector.
Figure 6A:
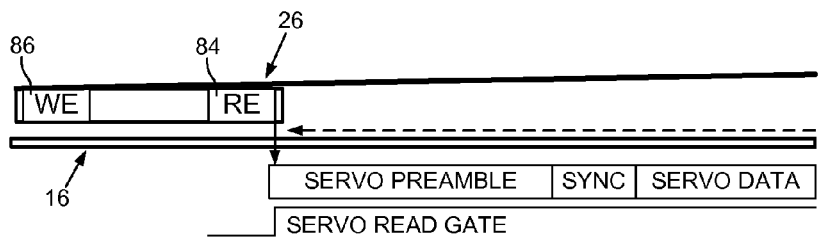
FIGS. 6A-6C illustrate an embodiment wherein at least part of a servo preamble is overwritten with data of a data sector during a write operation in order to eliminate the gap between the data sector and the servo sector.

In one embodiment, the data 40 that precedes the servo preamble 22 in FIG. 2B comprises at least part of the servo data 24. FIG. 5 shows an embodiment wherein the servo sector comprises a long format and a short format, wherein the short format facilitates writing a data sector up to the beginning of the servo sector (when the read element 84 leads the write element 86 as shown in FIG. 6A). The long format of the servo sector is read during non-write operations, such as during seeks and read operations. The servo sector can include a first preamble 72, a first sync mark 74, a high order of a servo track ID 76, a second preamble 78, a second sync mark 80, and a low order servo track ID 82. While tracking a data track during a write operation, the high order servo track ID 76 does not change and therefore in one embodiment is not fully read when reading a servo sector. Instead, the short format of the servo sector is read comprising the second preamble 78, the second sync mark 80, and the low order servo track ID 82. In this embodiment the servo gate may be opened while the read element 84 is over the high order servo track ID 76 as illustrated in FIG. 5 so that at least one of the high order bits of the servo track ID may be read to initialize the AFE 30 of the servo read channel. This embodiment reduces the length of the second preamble 78 by including just enough pattern to initialize the timing recovery circuit 32. The servo data 24 may comprise additional fields not shown in FIG. 5, such as a wedge ID that identifies the circumferential location of the head (the current servo sector). The wedge ID may be recorded in a split format similar to the track ID in FIG. 5, wherein a high order wedge ID may be recorded in the long format and a low order wedge ID may be recorded in the short format.

Figure 6B:
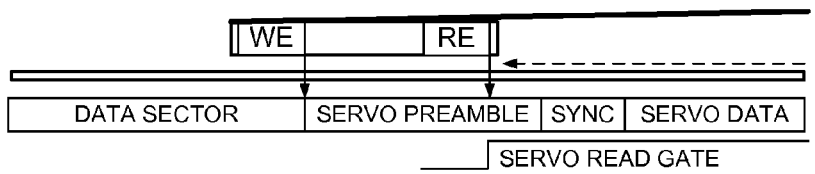
Figure 6C:
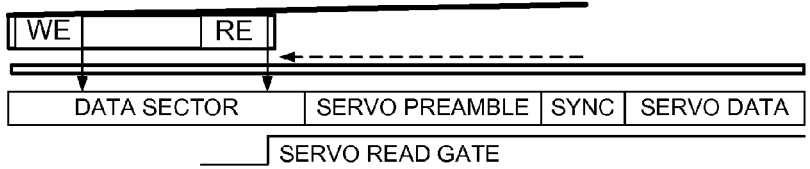

FIG. 6A shows an embodiment wherein an extended length servo preamble is initially written when servo writing the servo sectors to the disk. The extended length servo preamble is then read, for example, during a manufacturing procedure in order to improve the servoing operation. For example, the manufacturing procedure may learn servo compensation values (e.g., to compensate for a repeatable runout (RRO)) by reading the servo sectors, wherein the servo compensation values may then be written at the end of each servo sector as extended servo data. After executing the manufacturing procedure, data may be written to the data sectors, for example, during a defect scan of the data sectors or during normal write operations while the disk drive is deployed in the field. As shown in FIG. 6B, in one embodiment when a data sector is written preceding a servo sector the data sector overwrites at least part of the extended servo preamble. In this manner, there is no gap between the data sectors and the servo sectors shown in FIG. 4. This can avoid spurious, potentially random noise that may be generated when reading such a gap, as well as avoiding the need to erase such a gap. After overwriting the beginning part of the extended servo preamble with the data of a data sector as shown in FIG. 6B, during subsequent access operations the servo gate may be opened while the read element is over the data sector as shown in FIG. 6C in order to initialize the AFE 30 of the servo read channel.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk comprising a plurality of data tracks defined by servo sectors, where each data track comprises a plurality of data sectors, and each servo sector comprises a servo preamble and servo data;
a head comprising a read element and a write element; and
control circuitry comprising a servo read channel configured to read the servo sectors, the servo read channel comprising an analog front end and a timing recovery circuit, the control circuitry operable to:
during an access operation position the head over a first data track; and
during a revolution of the disk, access a first data sector of the first data track, and after accessing the first data sector:
read data preceding the servo preamble of a first servo sector in the first data track in order to initialize the analog front end of the servo read channel;
read at least part of the servo preamble to initialize the timing recovery circuit of the servo read channel; and
read at least part of the servo data of the first servo sector using the timing recovery circuit of the servo read channel,
wherein the data preceding the servo preamble comprises data of the first data sector in the first data track preceding the first servo sector.

2. The disk drive as recited in claim 1, wherein the control circuitry is further operable to overwrite at least part of the servo preamble with the data of the first data sector to substantially eliminate a gap between the first data sector and the first servo sector.

3. The disk drive as recited in claim 1, wherein the data preceding the servo preamble comprises at least part of the servo data of the first servo sector.

4. The disk drive as recited in claim 3, wherein accessing the first data sector comprises writing at least part of the first data sector proximate a beginning of the first servo sector.

5. The disk drive as recited in claim 3, wherein the data preceding the servo preamble comprises at least part of a servo track identifier (ID).

6. The disk drive as recited in claim 5, wherein the data preceding the servo preamble comprises a high order bit of the servo track identifier (ID).

7. A method of operating a disk drive comprising a disk comprising a plurality of data tracks defined by servo sectors, where each data track comprises a plurality of data sectors, and each servo sector comprises a servo preamble and servo data, a head comprising a read element and a write element, and control circuitry comprising a servo read channel configured to read the servo sectors, the servo read channel comprising an analog front end and a timing recovery circuit, the method comprising:
during an access operation positioning the head over a first data track; and
during a revolution of the disk, accessing a first data sector of the first data track, and after accessing the first data sector:
reading data preceding the servo preamble of a first servo sector in the first data track in order to initialize the analog front end of the servo read channel;
reading at least part of the servo preamble to initialize the timing recovery circuit of the servo read channel; and
reading at least part of the servo data of the first servo sector using the timing recovery circuit of the servo read channel,
wherein the data preceding the servo preamble comprises data of the first data sector in the first data track preceding the first servo sector.

8. The method as recited in claim 7, further comprising overwriting at least part of the servo preamble with the data of the first data sector to substantially eliminate a gap between the first data sector and the first servo sector.

9. The method as recited in claim 7, wherein the data preceding the servo preamble comprises at least part of the servo data of the first servo sector.

10. The method as recited in claim 9, wherein accessing the first data sector comprises writing at least part of the first data sector proximate a beginning of the first servo sector.

11. The method as recited in claim 9, wherein the data preceding the servo preamble comprises at least part of a servo track identifier (ID).

12. The method as recited in claim 11, wherein the data preceding the servo preamble comprises a high order bit of the servo track identifier (ID).

13. A disk drive comprising:
a disk comprising a plurality of data tracks defined by servo sectors, where each data track comprises a plurality of data sectors, and each servo sector comprises a servo preamble and servo data;
a head comprising a read element and a write element; and
control circuitry comprising a servo read channel comprising an analog front end and a timing recovery circuit, the control circuitry operable to:
during an access operation position the head over a first data track; and
during a revolution of the disk, access a first data sector of the first data track, and after accessing the first data sector:
read data preceding the servo preamble of a first servo sector in the first data track in order to initialize the analog front end of the servo read channel;
read at least part of the servo preamble to initialize the timing recovery circuit of the servo read channel; and read at least part of the servo data of the first servo sector using the timing recovery circuit of the servo read channel, wherein the data preceding the servo preamble comprises at least part of the servo data of the first servo sector.

14. A method of operating a disk drive comprising a disk comprising a plurality of data tracks defined by servo sectors, where each data track comprises a plurality of data sectors, and each servo sector comprises a servo preamble and servo data, a head comprising a read element and a write element, and control circuitry comprising a servo read channel comprising an analog front end and a timing recovery circuit, the method comprising:

during an access operation positioning the head over a first data track; and during a revolution of the disk, accessing a first data sector of the first data track, and after accessing the first data sector:

reading data preceding the servo preamble of a first servo sector in the first data track in order to initialize the analog front end of the servo read channel;

reading at least part of the servo preamble to initialize the timing recovery circuit of the servo read channel; and reading at least part of the servo data of the first servo sector using the timing recovery circuit of the servo read channel, wherein the data preceding the servo preamble comprises at least part of the servo data of the first servo sector.

\* \* \* \* \*